Nov. 7, 1950     A. L. KOHL     2,528,889

SOLUTION CONCENTRATION INDICATOR

Filed Nov. 23, 1946

INVENTOR

ARTHUR L. KOHL

BY *Mason & Graham*

ATTORNEYS

Patented Nov. 7, 1950

2,528,889

UNITED STATES PATENT OFFICE 2,528,889

SOLUTION CONCENTRATION INDICATOR

Arthur L. Kohl, Los Angeles, Calif., assignor to Turco Products, Inc., Los Angeles, Calif., a corporation of California Application November 23, 1946, Serial No. 711,980

1 Claim. (Cl. 175—183)

The present invention relates to an electronic indicator, and more particularly to a device for indicating when a predetermined minimum concentration of a solution has been attained.

In many types of solutions, for example saline and alkaline solutions, their conductivity is a function, when corrected for temperature, of the degree of concentration of the solution. This fact is well known and has been the basis for solution concentration indicators. Such previous developments have employed, for example, indicating instruments such as volt meters and the like connected either in parallel or in series with a circuit path through the solution to be tested, to indicate the relative conductivity and thereby the degree of concentration of the solution. These previous developments are useful in laboratory work, where an operator's principal duty consists in observing the position of the indicators on the instruments and making necessary corrections in accordance therewith. However, in commercial operations, for example machine dishwashing in restaurants and the like, the operator frequently is concerned only with his principal task of washing dishes. In such cases, the provision of a dishwashing machine with an ordinary type of solution concentration indicator is of little or no value, since personnel normally employed to wash dishes are not of the type which can be depended upon to observe ordinary indicating mechanisms and be guided by their indications.

An object of the present invention is to make an improved and simplified solution concentration indicator.

Another object is to make a solution concentration indicator having an electric circuit which includes a predetermined conductive path through a solution to be tested together with an electronic glow lamp which is adapted to glow at and above a predetermined critical value, the circuit including current control means which may be adjusted to predetermined solution concentration and temperature compensation.

Another object is to make a solution concentration indicator having an electric circuit with a relatively high voltage primary portion embodying an electronic glow lamp which is arranged to glow on the attainment of a predetermined condition in its circuit, the glow lamp circuit having electrical control means calibrated in accordance with solution concentration and temperature compensating requirements; and a coupled secondary circuit of substantially lesser voltage, which includes a predetermined electric current path through a solution to be tested.

These and other objects of the invention will be set forth more fully in the following description and the accompanying drawings, comprising one sheet. In the drawings.

Figure 1:
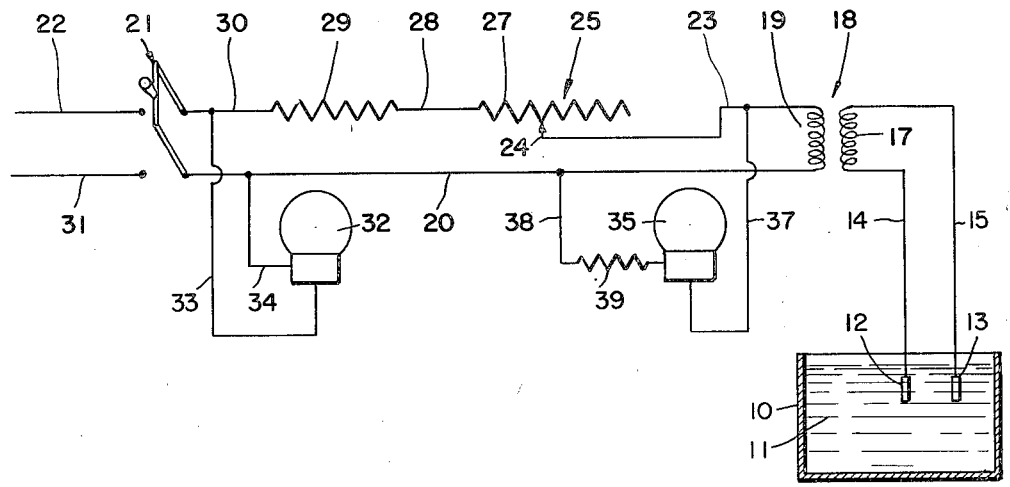
Fig. 1 is a schematic circuit drawing of a solution concentration indicator embodying the present invention.

Referring to the drawings in detail, 10 represents a tank, for example the solution tank of a dishwashing machine, in which a quantity of dishwashing solution 11 is contained. A pair of contact members 12 and 13 are mounted in the tank so as to be immersed in the solution in a suitable manner. The exposed surfaces of the contact members 12 and 13 are of suitable electrically conductive material to resist corrosion by the solution with which they are to be used. The contact members are connected, by conductors 14 and 15, respectively, to the terminals of a secondary coil 17 of a transformer 18.

A primary coil 19 of the transformer 18 has one terminal thereof connected to a conductor 20, which is connected, through one side of a two pole switch 21, to a conductor 31 comprising one side of an electrical supply line. The line may be energized with ordinary 115 volt, 60 cycle current. The other terminal of the primary coil 19 is connected by a conductor 23 to the slide, or arm, 24 of a variable current control device such as a variable resistor 25.

Other variable controls may, of course, be substituted for the resistance unit in accordance with common practice. In the embodiment illustrated, a resistance element 27 of the variable resistor 25 is connected, by a conductor 28, a fixed resistance 29, and a conductor 30, through the other side of the two pole switch 21, and thence to a conductor 22 comprising the other side of the line. The fixed resistance 29 is of a predetermined resistance for the particular solution to be employed, and the amount of resistance used would be compensated or changed if a solution having different current-concentration characteristics were to be employed.

An ordinary low wattage electric pilot lamp 32 is connected by conductors 33 and 34 across the conductors 20 and 30, so that at all times when the line switch is closed, the pilot lamp 32 will be lighted. This pilot lamp is employed merely to indicate that the line switch 21 is closed and that current is flowing in the conductors 20 and 30.

A gas filled glow lamp 35, which may be of the neon filled type which begins to glow at a predetermined difference of potential, for example sixty volts, is connected by conductors 37 and 38 through a fixed resistor 39 to the conductors 23 and 20. The amount of resistance of the resistor 39 is determined by the characteristics of the glow lamp 35, and with some types of glow lamp will be unnecessary.

Figure 3:
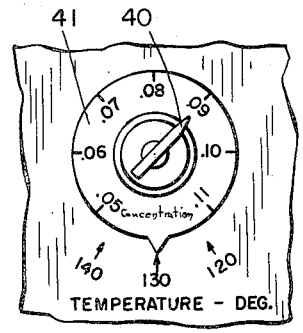
Fig. 3 is a double compensating control for controlling a current regulating device in accordance with solution concentration and temperature compensation requirements.

The variable resistor 25 preferably is controlled by a compensating dial, as indicated in Fig. 3. In this compensating dial arrangement a pointer 40 is secured on a shaft pivoted in, and extending through, a dial 41. The other end of the shaft 40 is secured in a usual manner to the arm or slide 24 of a rheostat of predetermined resistance characteristics. The dial 41 is pivoted on a usual type of insulating panel such as is used in electrical calibrating equipment. The dial 41, as illustrated, has a point projecting radially from its periphery, and lines are scribed on the panel indicating proper positions of this point to compensate for solution temperatures of 120, 130 and 140 degrees respectively. This covers the temperature range required for dishwashing machines for which the illustrated embodiment of the device is intended.

The marginal area of the dial has a scale imprinted thereon which indicates concentration characteristics of the solution. By setting the point on the dial to indicate the temperature of the solution, and then setting the pointer 40 on the dial scale to indicate a desired solution concentration, the rheostat wiper 24 will be set at a predetermined point. This point is calibrated to provide the required amount of resistance in the primary circuit to cause an ionized flow of current through the lamp 35 to light the lamp when the concentration of the solution and thereby its conductivity, increases beyond the amount indicated on the dial scale.

Instead of the compensating device illustrated, separate variable resistors may be employed if desired to compensate for temperature and concentration characteristics separately.

The operation of the circuit shown in Fig. 1 is as follows: When the circuit is connected to the line by closing the line switch 21, the pilot light 32 will be lighted, since it is connected directly across the line. Assuming that the degree of concentration of solution in the tank 10 is extremely low, and that the resistance across the contact members 12 and 13 is, therefore, comparatively high, very little current will flow in the secondary coil 17. This low flow of current in the secondary circuit will impede the flow of current through the primary coil 19. The impedance thus set up in the primary coil by the high resistance in the secondary will cause a relatively great difference in potential between the conductors 20 and 23. Current therefore will tend to flow from the conductor 20 on one side of the line, through the conductor 37, the gas filled glow lamp 35, the fixed resistance 39 and the conductor 38 to the conductor 23 on the other side of the line.

If the impedance of the primary coil is sufficiently high and the combined resistances of the fixed resistor 29, and the variable resistor 25 is sufficiently low, the potential difference through the glow lamp 35 will ionize the gas therein to a point which will cause the lamp to glow. These factors are predetermined so that the glow lamp 35 will glow when the solution strength drops below the required minimum as determined by the setting of the pointer 40 and dial 41.

If the concentration of the solution, and therefore its conductivity, is increased, a greater flow of current will of course occur in the secondary circuit. This increased flow of current in the secondary reduces the impedance effect in the primary coil and therefore permits a greater flow of current through the primary coil. This increased flow through the primary coil tends to shunt the current from its previous path through the glow lamp. When the difference in potential across the glow lamp thus is reduced an amount determined by the setting of the dial 41, the pointer 40 and the increased conductivity of the solution 11, the glow lamp 35 will be deionized and will cease to glow.

This arrangement whereby the glow lamp is illuminated only when the concentration of the solution is below a predetermined minimum is desirable, since dishwashing personnel are inclined to increase the strength of the solution far beyond that necessary for satisfactory operation of the dishwashing machine. With the arrangement illustrated in Fig. 1, the glow lamp 35 will be illuminated only when the concentration of the solution is below that determined by the setting of the concentration indicator 40 and temperature compensating dial 41.

If it is desired to determine the actual concentration of the solution at any time, the operator need only turn the knob 40 clockwise until the glow lamp 35 goes on. The reading of dial 41 opposite the pointer then may be interpreted to indicate the solution concentration.

Figure 2:
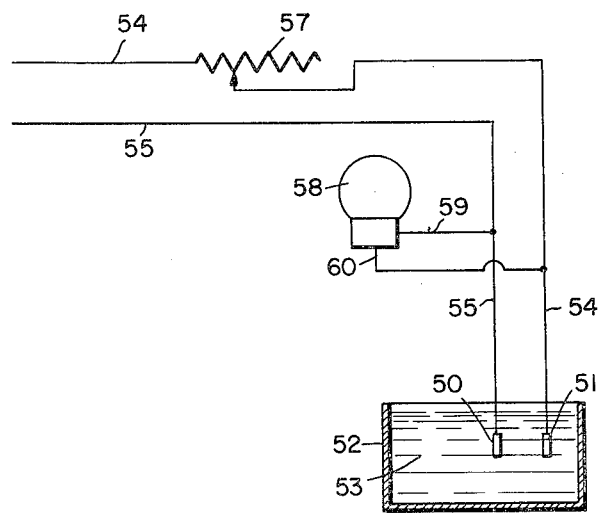
Fig. 2 is a similar schematic drawing of a modified form of solution concentration indicating circuit.

In the circuit shown in Fig. 2, a pair of contact terminals 50 and 51, which may be of the same type as those illustrated in Fig. 1, are arranged to be immersed in a solution 53 in a tank 52. These contact terminals are connected, by conductors 54 and 55, to opposite sides of a circuit, for example a 115 volt, 60 cycle circuit. A variable resistor 57 is mounted in the conductor 54 and may be controlled by suitable means such as a pointer 40 and dial 41 similar to that illustrated in Fig. 3. A glow lamp 58 is connected in parallel with the contact terminals 50 and 51, by means of conductors 59 and 60, which are connected respectively to the conductors 54 and 55.

In the circuit illustrated in Fig. 2, the glow lamp 58 will be illuminated when the resistance between the contact members 50 and 51 is sufficiently high to produce an adequate drop in potential across the glow lamp. When the conductivity of the solution is sufficiently great to produce a shunt flow of sufficient current between the contact terminals, and thus to lower the voltage drop through the lamp below its predetermined minimum requirement, the lamp 58 will be extinguished.

In both circuits illustrated in Figs. 1 and 2 it is considered preferable to have the controls for the variable resistance units mounted within a cabinet or otherwise concealed so as not to be readily available to the dishwashing personnel. By this arrangement the proprietor or manager of the establishment can set the controls for the required degree of concentration and temperature. The dishwashing personnel then merely will be instructed to add sufficient powder or concentrate to extinguish the glow lamp when it is illuminated. The addition of powder or concentrate when the lamp is not illuminated may be prohibited. By placing the glow lamp in a position where it is visible to supervisory personnel as well as to the operators of the dishwashing machine, wasting of the material may be prevented or at least substantially reduced, while at the same time insuring that a solution of adequate concentration is being employed.

While I have illustrated and described a preferred embodiment of my invention and one modification thereof, it will be understood by those familiar with the art that these showings are illustrative only, and that the device is capable of modification without departing from the spirit of the invention. It is desired, therefore, not to limit the invention except as defined in the following claim.

I claim:

A solution minimum concentration indicator comprising, in combination with a tank adapted to contain a solution; a primary electrical circuit, a secondary circuit having electrical induction coupling therewith, a pair of spaced apart contact terminals in the secondary circuit adapted to be immersed in solution in the tank, an electronic lamp having predetermined ionization characteristics shunt-mounted in the primary circuit, and variable current control means mounted in the primary circuit to vary shunt operation of the lamp whereby the difference in current potential across the lamp shunt comprises a function of current flow in the secondary circuit, including current flow in the solution between said contact terminals, a fixed member presenting calibrated temperature indicia, and a dial, mounted to rotate relative to said member carrying a pointer for selective registration with said indicia and carrying indicia calibrated in percentages of solution concentration units, and a pointer operatively connected to said variable current control means, said pointer being movably mounted for selective registration with the last named indicia.

ARTHUR L. KOHL.

REFERENCES CITED

The following references are of record in the file of this patent:

UNITED STATES PATENTS

| Number | Name | Date |
|---|---|---|
| 1,996,063 | Corkran | Apr. 2, 1935 |
| 2,068,499 | Mackenzie | Jan. 19, 1937 |
| 2,221,307 | Christie | Nov. 12, 1940 |
| 2,224,382 | Douty | Dec. 10, 1940 |
| 2,290,574 | Shafer | July 21, 1942 |